United States Patent Office 3,681,267
Patented Aug. 1, 1972

3,681,267
PROPIOLACTONE STABILIZATION
Neil R. Mayne and Johan van Olmen, Amsterdam, Netherlands, assignors to Shell Oil Company, New York, N.Y.
No Drawing. Filed July 16, 1970, Ser. No. 55,611
Int. Cl. C07d 3/00
U.S. Cl. 260—343.9                    4 Claims

ABSTRACT OF THE DISCLOSURE

Stabilizing propiolactones by incorporating therein a minor amount of sulfur dioxide. The resulting stabilized compositions, comprising a propiolactone substituted on the alpha carbon thereof with from 1 to 2 alkyl substituents and a minor amount of sulfur dioxide, are characterized by an enhanced stability during their manufacture and storage as shown by a reduced tendency toward autopolymerization.

BACKGROUND OF THE INVENTION

Propiolactones, especially $\alpha$-substituted $\beta$-propiolactones, are of interest as precursors of polymeric materials useful in the production of synthetic fibers. Such homopolymeric polyesters, when of high molecular weight, are highly crystalline products and have high melting points, each of which is a desirable and useful property. The propiolactone monomers, however, are unstable and tend to polymerize during manufacture, storage and transport, particularly at elevated temperature, to form less desirable polymers of low molecular weight, thereby rendering more difficult the subsequent production of high-molecular-weight polymer. This tendency is greatly magnified in refining, which involves distillation at elevated temperatures. It is therefore of advantage to provide a method for enhancing the stability of the propiolactone monomer and for retarding premature polymerization. J.C. Martin in U.S. Pat. 3,117,980, issued Jan. 14, 1964, discloses a method of stabilizing $\beta$-lactones by adding thereto certain nitrated phenols, e.g., picric acid. G. P. Hildebrand in U.S. Pat. 3,392,174, issued July 9, 1968, discloses a method of stabilizing propiolactones by incorporating therein phosphorous acid. A. Klootwijk in U.S. Pat. 3,435,052, issued Mar. 25, 1969, discloses a method of stabilizing $\beta$-lactones with $\alpha$-halocarboxylic acids, e.g., trifluoroacetic acid, and in U.S. Pat. 3,448,122, issued June 3, 1969, discloses a method of stabilizing $\beta$-lactones with a minor amount of an additional compound of a boron trihalide, e.g., boron trifluoride, and a Lewis base, e.g., tribenzylamine. The above stabilizers possess one or more of the following disadvantages: inadequate activity, strong color and nonvolatility. For example, the boron trifluoride-tribenzylamine adduct, though possessing a powerful stabilizing effect, is useful only in the storage of liquid lactone. Due to its nonvolatility the stabilizer is absent in the lactone vapors, which tend to polymerize upon the surfaces of distillation zones during refining procedures.

SUMMARY OF THE INVENTION

The present invention provides an improved method of stabilization of propiolactones during their manufacture and storage by incorporating therein a minor amount of sulfur dioxide. It has now been found that incorporation of small amounts of sulfur dioxide stabilize propiolactones, not only during storage, but also in refining involving distillation. The invention also provides stabilized compositions comprising a propiolactone substituted on the alpha carbon thereof with from 1 to 2 alkyl substituents and a minor amount of sulfur dioxide, which compositions are characterized by an increased stability at temperatures at or higher than those likely to be encountered during either storage or refining operations as manifested by a greatly reduced tendency toward autopolymerization.

DESCRIPTION OF PREFERRED EMBODIMENTS

The propiolactone which comprises the major component of the compositions of the invention is a $\beta$-lactone of at least one substituent other than hydrogen on the carbon atom alpha to the carboxy moiety and may be described as a propiolactone of from 4 to 11 carbon atoms of the formula

(I)

wherein R is alkyl of up to 4 carbon atoms and R' is hydrogen or R. Illustrative of such lactones are $\alpha$-methyl-$\beta$-propiolactone,
$\alpha$-ethyl-$\beta$-propiolactone,
$\alpha$-butyl-$\beta$-propiolactone,
$\alpha,\alpha$-dimethyl-$\beta$-propiolactone (pivalolactone),
$\alpha,\alpha$-diethyl-$\beta$-propiolactone,
$\alpha,\alpha$-dipropyl-$\beta$-propiolactone,
$\alpha,\alpha$-dibutyl-$\beta$-propiolactone,
$\alpha$-methyl-$\alpha$-ethyl-$\beta$-propiolactone, and
$\alpha$-ethyl-$\alpha$-tert-butyl-$\beta$-propiolactone. In general, preferred propiolactones of the above Formula I are those wherein both R and R' are alkyl of up to 4 carbon atoms, and particularly satisfactory are compositions wherein the propiolactone component is $\alpha,\alpha$-dimethyl-$\beta$-propiolactone (pivalolactone). In addition to the $\alpha$-substituted propiolactones, the compositions may contain minor amounts, i.e., up to 50% by weight, based on $\alpha$-substituted propiolactone, of other lactones such as $\beta$-propiolactone and $\epsilon$-caprolactone.

The above-described $\alpha$-substituted $\beta$-propiolactones are stabilized by incorporating therein sulfur dioxide. The stabilizer is employed in a relatively minor amount. Effective stabilization is obtained when the amount of sulfur dioxide employed in the lactone-containing composition is from about 0.0001% by weight to about 2% by weight of $\alpha$-substituted $\beta$-propiolactone present. Amounts of sulfur dioxide from about 0.0005% wt. to about 2% wt. on the same basis are preferred and amounts of sulfur dioxide from about 0.001% wt. to about 0.005% wt. on the same basis are particularly preferred. The stabilized compositions may be in the solid, liquid, or vaporous state.

The stabilized compositions are prepared by intimately contacting the lactone with sulfur dioxide, thereby obtaining an essentially homogeneous mixture. The precise method of obtaining intimate contact is not critical and methods such as bubbling in sulfur dioxide gas, shaking, dissolving, stirring, adding liquid sulfur dioxide under pressure, and the like are suitable.

In refining operations, which generally involve distillation carried out under reduced pressure, i.e., under vacuum, it is convenient to introduce the sulfur dioxide to the distillation zone, e.g., to the bottom of a distillation column, in the form of a mixture of sulfur dioxide and an inert gas. Suitable inert gases include nitrogen, helium, argon, and the like; nitrogen is particularly preferred. The sulfur dioxide content of the inert gas admixture as utilized hereinabove is generally at least about 0.01% by volume and preferably from about 0.1% to about 1% vol.

It is often advantageous to employ in combination with the sulfur dioxide stabilizer of the invention a propiolactone stabilizer of the nonvolatile type. Representative of nonvolatile propiolactone stabilizers useful in such combination are the aromatic sulfonic acids, e.g., p-toluenesulfonic acid, disclosed by A. Klootwijk in U.S. Pat. 3,394,149, issued July 23, 1968, and the addition compounds of boron trihalide and Lewis bases, e.g., boron trifluoride-amine adducts, of U.S. Pat. 3,448,122. By way of illustration, in a refining operation, it is of advantage to have present a nonvolatile stabilizer in the propiolactone feed to the distillation zone and either to introduce the sulfur dioxide stabilizer together with the above-described feed or to introduce the sulfur dioxide in the form of an inert gas admixture into the distillation zone, e.g., into the bottom of a distillation column. For this purpose preferred nonvolatile stabilizers are the boron trifluoride-amine adducts of U.S. Pat. 3,448,122, particularly the boron trifluoride-tribenzylamine, in an amount of from about 0.01% wt. to about 0.1% wt. based on the weight of α-substituted β-propiolactone present.

As previously stated the method of the invention is useful in providing compositions comprising the α-substituted β-propiolactones which exhibit enhanced storage stability and thermal stability during refining operations as shown by a reduced tendency toward the autopolymerization generally exhibited by such unstabilized lactones. The stabilized compositions are polymerizable by known catalytic methods to high-molecular-weight polymers without appreciable detriment arising from the presence of the stabilizer. If desired, however, the sulfur dioxide stabilizer is partially or essentially wholly separated from the lactone monomer prior to polymerization by conventional methods, e.g., stripping with an inert gas such as nitrogen or selective extraction.

The stabilized lactone compositions are particularly useful in providing precursors of high-molecular-weight polymers due to the relatively small proportion of low-molecular-weight polymer formed during the refining, storage and handling of the lactone monomer composition prior to polymerization.

EXAMPLE I

A series of compositions was prepared by dissolving controlled amounts of sulfur dioxide in samples of α,α-dimethyl-β-propiolactone (pivalolactone) in closed tubes with a small gas cap. In each case, the stabilizing effect was measured by maintaining the composition at 100° C. and determining the time required for the composition to turn cloudy, indicating the formation of polymer in the lactone sample. The results of these determinations are shown in Table I wherein the amount of sulfur dioxide employed in the pivalolactone-containing composition is given as percent by weight based on the weight of pivalolactone and the term "Time" is the time in hours required for the composition to turn cloudy, i.e., for the formation of polymer.

TABLE I

| Amount sulfur dioxide stabilizer: | Time |
|---|---|
| 0 | 18–20 |
| 0.02 | 242–298 |
| 0.1 | 242–298 |
| 0.2 | >350 |

EXAMPLE II

This example demonstrates that the stabilized composition is polymerizable without appreciable detriment arising from the presence of the stabilizer.

To pivalolactone, saturated at room temperature with sulfur dioxide, 1% by weight of tributylphosphine was added. After 5 minutes an exothermic polymerization set in, yielding 70% wt. of a polymer having a limiting viscosity number of 0.2 (measured in benzyl alcohol at 150° C.) and a melting point of 228–235° C.

EXAMPLE III

Pivalolactone was refluxed under vacuum of 50 mm. Hg, employing an adiabatic vigreux column and on top thereof a total reflux cooler. The reflux ratio through the column was 5:1 while the non-refluxed lactone was returned to the bottom of the column at a rate of 100 ml./hr. Nitrogen containing 0.16% vol. of sulfur dioxide was bubbled through the lactone in the bottom of the column at a rate of 5 l./hr. The bottom and top temperatures were 83 and 80° C., respectively. After 6½ hours no polymer had deposited anywhere in the system. The lactone returned to the bottom contained 10 parts per million parts by weight of sulfur dioxide.

EXAMPLE IV

A crude pivalolactone was refined by distillation in an adiabatic column of 5-cm. width and 2-m. length filled with Dixon rings. The feed was introduced in the middle of the column at a rate of 350 ml./hr. Nitrogen containing 0.29% vol. of sulfur dioxide was introduced at the bottom at a rate of 5 l./hr. The pressure in the column was 67 mm. Hg, the bottom temperature 112° C., the top temperature 85° C., and the reflux ratio 5:2. The bottom product contained 7% of lactone; the pivalolactone top-product, 18 parts per million parts by weight of sulfur dioxide. No polymer formation was observed in the column.

The pivalolactone top-product containing 18 parts per million of sulfur dioxide was polymerized without difficulty in refluxing hexane (1:2 volume ratio) by addition of 0.5% wt. of a prepolymer of pivalolactone. The prepolymer had a molecular weight of 6700. The lactone was quantitatively converted to a high-molecular-weight polymer having a limiting viscosity number of 2.8.

We claim as our invention:

1. A composition consisting essentially of (a) an α-substituted-β-propiolactone of the formula

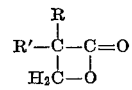

wherein R and R' are alkyl of up to 4 carbon atoms and (b) a stabilizing amount of from about 0.0001% wt. to about 2% wt. of sulfur dioxide, said weight based on the weight of the α-substituted-β-propiolactone.

2. The composition of claim 1 wherein R and R' are methyl.

3. The composition of claim 1 wherein from about 0.0005% wt. to about 2% wt. of sulfur dioxide is present.

4. The composition of claim 3 wherein from about 0.001% wt. to about 0.005% wt. of sulfur dioxide is present.

References Cited

UNITED STATES PATENTS 3,492,315   1/1970   Nakahara et al. ____ 260—343.9

HENRY R. JILES, Primary Examiner

A. M. T. TIGHE, Assistant Examiner

U.S. Cl. X.R.

203—8; 252—397

PO-1050
(5/69)

UNITED STATES PATENT OFFICE
CERTIFICATE OF CORRECTION

Patent No. 3,681,267            Dated August 1, 1972

Inventor(s) NEIL R. MAYNE and JOHAN VAN OLMEN

It is certified that error appears in the above-identified patent and that said Letters Patent are hereby corrected as shown below:

Following the filing date and Serial Number in the heading of the patent reference to the claim to priority has been omitted, which reference should read:

"Claims Priority Application, Great Britain, July 18, 1969
36,347/69"

Signed and sealed this 23rd day of January 1973.

(SEAL)
Attest:

EDWARD M. FLETCHER, JR.            ROBERT GOTTSCHALK
Attesting Officer                  Commissioner of Patents